US008559937B2

(12) United States Patent
Ram et al.

(10) Patent No.: US 8,559,937 B2
(45) Date of Patent: Oct. 15, 2013

(54) WIRELESS SYSTEM FOR PROVIDING CRITICAL SENSOR ALERTS FOR EQUIPMENT

(75) Inventors: Satish N. Ram, Poway, CA (US); Charles Pedersen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1106 days.

(21) Appl. No.: 11/230,352

(22) Filed: Sep. 19, 2005

(65) Prior Publication Data

US 2006/0276185 A1 Dec. 7, 2006

Related U.S. Application Data

(60) Provisional application No. 60/688,626, filed on Jun. 7, 2005.

(51) Int. Cl.
*H04M 3/00* (2006.01)
*G01M 17/00* (2006.01)
*B60Q 1/00* (2006.01)

(52) U.S. Cl.
USPC ......... 455/420; 455/418; 701/29.1; 701/31.4; 340/438

(58) Field of Classification Search
USPC ................. 455/420, 90.1; 340/539.22, 539.1, 340/539.11, 539.16, 539.17, 438–439, 340/449–452; 701/29–31, 33, 2, 31.4–32.1, 701/32.7, 33.2, 33.7–34.1
See application file for complete search history.

(56) References Cited

U.S. PATENT DOCUMENTS

| | | | | |
|---|---|---|---|---|
| 5,844,800 | A | 12/1998 | Brandt et al. | |
| 6,295,492 | B1 | 9/2001 | Lang et al. | |
| 6,370,454 | B1 | 4/2002 | Moore | |
| 6,594,579 | B1 | 7/2003 | Lowrey et al. | |
| 6,604,033 | B1 | 8/2003 | Banet et al. | |
| 6,611,740 | B2 | 8/2003 | Lowrey et al. | |
| 6,636,790 | B1 | 10/2003 | Lightner et al. | |
| 6,732,031 | B1 | 5/2004 | Lightner et al. | |
| 6,732,032 | B1 | 5/2004 | Banel et al. | |
| 6,879,894 | B1 | 4/2005 | Lightner et al. | |
| 6,892,131 | B2 | 5/2005 | Coffee et al. | |
| 6,928,348 | B1 | 8/2005 | Lightner et al. | |
| 6,957,133 | B1 | 10/2005 | Hunt et al. | |
| 6,988,033 | B1 | 1/2006 | Lowrey et al. | |
| 7,002,462 | B2 * | 2/2006 | Welch | 340/506 |
| 7,113,127 | B1 | 9/2006 | Banet et al. | |
| 7,174,243 | B1 | 2/2007 | Lightner et al. | |
| 7,225,065 | B1 | 5/2007 | Hunt et al. | |
| 7,228,211 | B1 | 6/2007 | Lowrey et al. | |

(Continued)

OTHER PUBLICATIONS

SAE J1708, "Serial Data Communications between Microcomputer Systems in Heavy-Duty Vehicle Applications," Aug. 2004.

(Continued)

*Primary Examiner* — George Eng
*Assistant Examiner* — Nam Huynh
(74) *Attorney, Agent, or Firm* — Gerald P. Joyce, III

(57) ABSTRACT

A wireless system is provided which enables a remotely located equipment monitor to control the equipment in the event that more than one alert or alarm for the same fault condition, at the equipment have been ignored by the equipment operator. Control options include instructing the operator to shut equipment down, automatically shutting the equipment down and putting the equipment in a safe mode of operation.

32 Claims, 2 Drawing Sheets

(56) References Cited

U.S. PATENT DOCUMENTS

| | | | | |
|---|---|---|---|---|
| 7,312,703 | B2 | 12/2007 | Hoogenboom | |
| 7,434,643 | B2 | 10/2008 | Lesesky et al. | |
| 7,477,968 | B1 | 1/2009 | Lowrey et al. | |
| 7,523,159 | B1 | 4/2009 | Williams et al. | |
| 7,532,962 | B1 | 5/2009 | Lowrey et al. | |
| 7,532,963 | B1 | 5/2009 | Lowrey et al. | |
| 7,711,842 | B2 | 5/2010 | Liu et al. | |
| 2003/0055666 | A1 * | 3/2003 | Roddy et al. | 705/1 |
| 2003/0060949 | A1 * | 3/2003 | Letang et al. | 701/29 |
| 2004/0039502 | A1 * | 2/2004 | Wilson et al. | 701/29 |
| 2004/0073468 | A1 * | 4/2004 | Vyas et al. | 705/8 |
| 2004/0113761 | A1 * | 6/2004 | Borugian | 340/426.1 |
| 2005/0143956 | A1 * | 6/2005 | Long et al. | 702/184 |
| 2005/0256681 | A1 | 11/2005 | Brinton et al. | |
| 2006/0273896 | A1 * | 12/2006 | Kates | 340/539.18 |
| 2007/0200664 | A1 | 8/2007 | Proska et al. | |
| 2007/0288154 | A1 | 12/2007 | Letang | |
| 2008/0059080 | A1 | 3/2008 | Greiner et al. | |
| 2008/0059411 | A1 | 3/2008 | Greiner et al. | |
| 2008/0180523 | A1 | 7/2008 | Stratton et al. | |
| 2009/0015422 | A1 | 1/2009 | Sixt, Jr. et al. | |

OTHER PUBLICATIONS

SAE J1939, “Recommended Practice for a Serial Control and Communications Vehicle Network,” Issued Apr. 2000, Revised Oct. 2007.

* cited by examiner

WIRELESS SYSTEM FOR PROVIDING CRITICAL SENSOR ALERTS FOR EQUIPMENT

RELATED APPLICATIONS

This application claims priority to U.S. Provisional Application No. 60/688,626, filed on Jun. 7, 2005.

BACKGROUND

Monitoring and managing equipment in remote locations presents a challenging task, particularly for equipment leasing companies. This task becomes even more challenging for mobile equipment such as heavy construction vehicles. Notification in real time of problems which occur in the field can prove to be very useful in scheduling maintenance. Operation of equipment in such a manner which may create additional equipment problems or which may exacerbate existing problems remains problematic.

There are currently systems which monitor the operation of a remotely located piece of equipment including its location. In instances where the machine is operating outside of a designated geographical area, there exist disclosure of security systems which serve to shut down a piece of equipment. See U.S. Published Patent Application 200040073468 to Vyas et al. Additionally, while it is known that existing systems can give alerts or alarms to equipment operators in case of equipment malfunction, until now, no systems currently exist which allow the equipment owner or leasing entity to take control of equipment when those alerts or alarms are ignored so as to prevent equipment damage.

Applicable reference numbers have been carried forward.

DETAILED DESCRIPTION

A wireless equipment management system 2 is provided for managing equipment 4, e.g., mobile or non-mobile machines.

Figure 1:
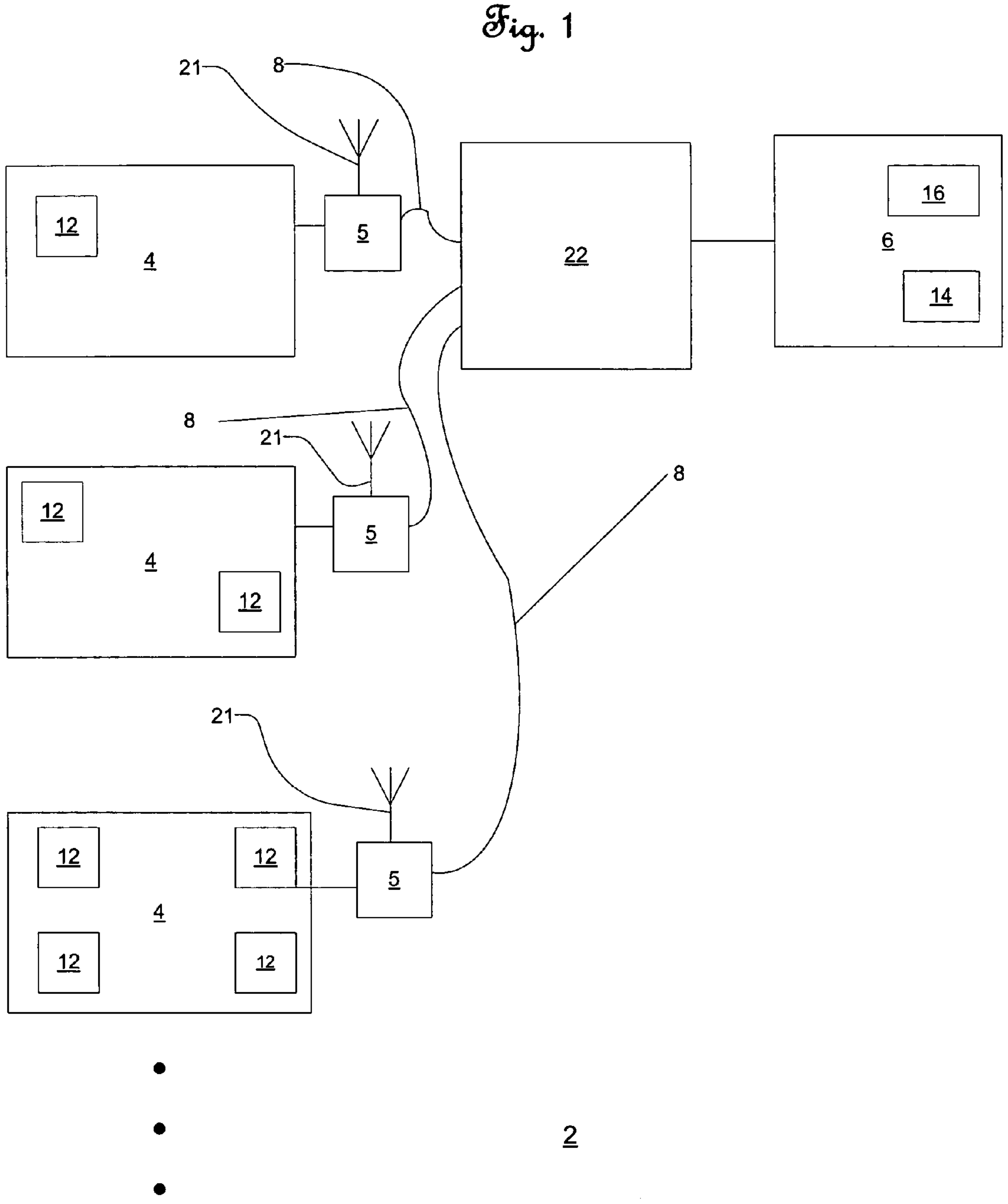
FIG. 1 illustrates a block diagram of an equipment management system.

FIG. 1 illustrates a block diagram of equipment management system 2. FIG. 1 shows a plurality of monitored equipment 4 (coupled to data processing center 6 through wireless communications link 8 represented by arrows). Equipment 4 can represent heavy equipment, office equipment, surface, land and air vehicles, etc. This includes engines, automobiles, trucks, construction, agricultural or earthmoving equipment, computers, consumer electronics, copiers, printers, facsimile machines, et cetera (communications link 8 can include a satellite data link, an analog cellular telephone communications link (using, for instance, frequency division multiple access (FDMA), a digital cellular communications link (using e.g., code division multiple access (CDMA), time division multiple access (TDMA), etc.) a radio link, Bluetooth, Wi-fi(802.11a, 802.11b, 802.11g etc.), or a combination thereof. Data processing center 6 receives status information related to monitored equipment 4. In one aspect, each monitored piece of equipment 4 can include one or more sensors 12 for measuring equipment usage or operating characteristics.

In one embodiment, data processing center 6 receives signals, via communications link 8 from the one or more sensors 12, containing data relating to equipment usage and/or operating characteristics. The received data is stored at data processing center 6 which can adaptively track the operation of each piece of monitored equipment 4 based on data from sensors 12. For example, one of equipment 4 shown could represent an engine wherein a sensor 12 measures odometer mileage. Another sensor 12 can measure, for instance, ambient operating temperatures. An oil change maintenance schedule and an oil type can be calculated at data processing center 6 based upon the data supplied by sensors 12. For instance under predominantly and relatively high ambient temperatures, a higher weight oil and more frequent oil change scheduling at shorter odometer mileage intervals between scheduled oil changes may be prescribed to reduce engine wear. Predominantly cooler ambient temperatures over longer odometer readings may dictate a lower weight oil with more miles between oil changes. Consequently, an engine or piece of heavy equipment operating in area near the Sahara Desert in Africa could have an entirely different maintenance schedule from the same engine operating in Iceland as determined by processing center 6. Alternatively, in the case of a copier or facsimile machine sensor 12 can measure toner levels and copier usage hours to adaptively determine toner cartridge replacement scheduling and/or ordering. In addition, should a fault condition occur at the monitored equipment, such as no oil sensed in the engine, an alarm or alert can be processed to the equipment operator.

Data processing center 6 can contain one or more servers which operate to run computer programs that manage alerts and/or prepare equipment maintenance schedules for a plurality of equipment 4. Equipment operating data, historical usage data, maintenance schedules and equipment location information can also be tracked and maintained by one or more servers at data processing center 6.

Equipment manager 14 within data processing center 6 can be implemented as a server programmed to calculate operation recommendations in the case of alerts and servicing schedules for each monitored piece of equipment 4. Data on each monitored piece of equipment can be maintained in memory storage represented by functional block 16 as accomplished, for instance, in the same server as that for equipment manager 14 or in a separate server therefrom for storage of collected data. This data includes equipment specifications, and operating data including historical usage data. For instance, information relating to repair histories, in-service hours, fuel consumption, location information and operating costs can be stored in memory storage 16.

Wireless equipment system 2 is preferably a computer-based system that uses the Transmission Control Protocol/Internet Protocol (TCP/IP) networking protocol. Further this system 2 is particularly suitable for the Internet, particularly with broadband Internet. Wireless system 2 is accessible from multiple sources concerning maintenance scheduling. Different levels of security can be meted out to each system user depending on information needs et cetera.

Wireless equipment system 2 can be implemented using a combination of wireless technology, data handling functionality construction industry constructs as provided, for example, by an equipment management solution such as GlobalTRACS® by QUALCOMM®. An equipment management solution automatically collects, organizes and transmits vital information concerning how the equipment is being used, how much equipment is being used as well as the location of that equipment. This information is especially useful to entities renting, distributing, contracting or owning equipment-particularly construction equipment. The equipment management solution can track equipment use such as engine hour use as reported by a sensor tracking usage hours of a system on a piece of equipment, such as an engine. Further, the equipment management solution can provide global positioning system (GPS)-based equipment location information including data indicating when a piece of equipment has moved outside of a pre-set boundary.

Figure 2:
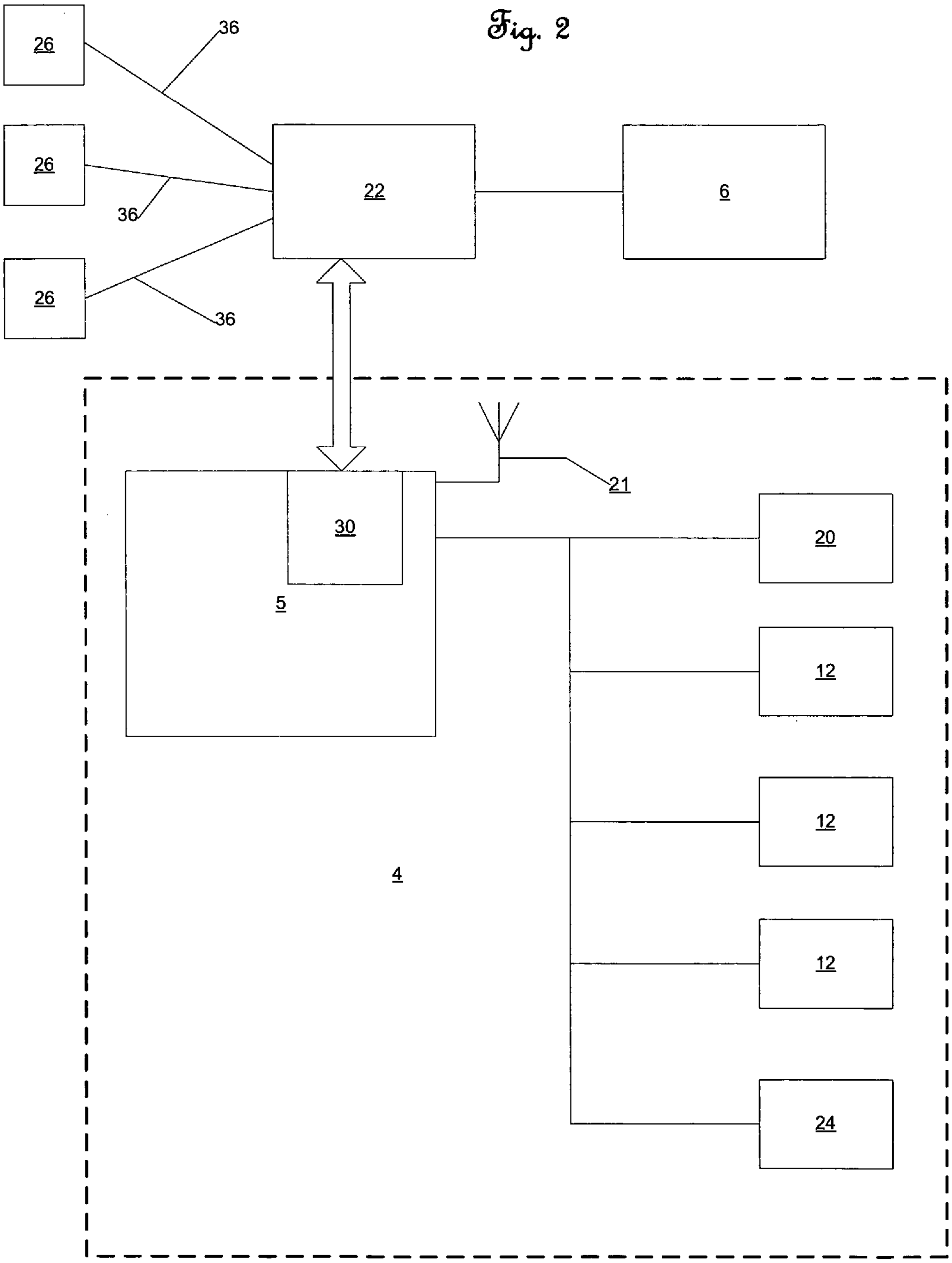
FIG. 2 is a block diagram illustrating how each sensor and/or controller on a piece of equipment is used to monitor or control a piece of equipment or system or function on a piece of equipment.

FIG. 2 is a block diagram of illustrating how each sensor 12 and/or controller 20 on a piece of equipment 4 is used to monitor or control equipment 4 or system or function on equipment 4. In one embodiment, each sensor 12 and controller 20 on equipment 4 is connected through a controller area network (CAN).

In one embodiment each sensor 12 and controller 20 on the same piece of equipment can act as a CAN slave device connected to a CAN master controller 5. Master controller 5 includes antenna 21 which is used in connection with transmitting and receiving Code Division Multiple Access (CDMA) signals. However, other communications systems for use in connection with antenna 21 are contemplated, e.g., Time Division Multiple Access, et cetera.

In one aspect of an embodiment, a J1939 higher layer protocol is used for the CAN. The SAE (Society of Automotive Engineers published the J1939 set of specifications supporting SAE class A, B, and C communication functions. A J1939 network connects electronic control units (ECU) within a truck and trailer system. The J1939 specification which pertains to engine, transmission, and brake message definitions is especially useful for diesel engine applications. Alternatively, the SAE J1708 specification, "Serial Data Communications between Microcomputer Systems in Heavy Duty Vehicle Applications," can be used.

Data received by each sensor 12 on a piece of equipment 4 is sent to CAN master controller 5 where it is stored until downloaded by system controller 22 through wireless communications link 8.

Operator controller 24 receives alerts in the form of warning messages, instructions, alarms, etc. to warn an equipment operator (not shown) of conditions (faulty operation, etc.) sensed on equipment 4 by a sensor 12, thereby allowing the operator to take or institute corrective or preventative action.

Equipment manager 14 in conjunction with data processing center 6 analyzes data received from each CAN master controller 5. As a result thereof, equipment manager 14 issues, inter alia, maintenance recommendations, alerts, alarms to system controller 22 which in turn forwards the same to a user control/monitoring site 26. A control/monitoring site 26 can represent, for instance, the owner of rental equipment. Through link 36, communications can be had between each control/monitoring site 26 and equipment manager 14 through system controller 22 pertaining to a specified piece of equipment 4. Communications over link 36 can occur by numerous ways. For instance, these communications can occur over the Internet, via e-mail, text messages, etc. Equipment manager 14 function can adapt to inputs, requests, etc. from control/monitoring sites 26. For instance, a maintenance step can be moved up ahead of schedule at the request of a control/monitoring site 26.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A management system for a vehicle, comprising:
- a monitor site located remotely from said vehicle;
- a processor located remotely from said vehicle, said processor being operable to:
  - receive information from a sensor in said vehicle regarding at least one of vehicle usage and operating characteristics of said vehicle;
  - detect a condition associated with said vehicle based on said information;
  - generate an alert for said vehicle based on said condition;
  - generate an operation recommendation for said vehicle based on said condition, after the generation of said alert for said condition; and
  - send said alert to the monitor site monitoring said vehicle; and
- wherein said monitor site is operable to:
  - detect whether said condition remains, based on information from the same sensor, after said alert is sent a predetermined number of times; and
  - initiate the operation recommendation when said condition is detected after said alert is sent a predetermined number of times.

2. The management system for said vehicle as recited in claim 1, wherein said operation recommendation for said vehicle comprises at least one of measures selected from shutting said vehicle off, placing said vehicle in a safe mode of operation, or a combination thereof.

3. The management system as recited in claim 2, wherein said safe mode of operation defines vehicle operation which minimizes damage to said vehicle as a result of continued operation during an existence of said predetermined condition.

4. The management system as recited in claim 1, wherein said communications system is a wireless communications system.

5. The management system as recited in claim 1, wherein said communications system is a mobile communications system selected from the group consisting of a Code Division Multiple Access (CDMA) communications system, a Time Division Multiple Access (TDMA) system, a Frequency Division Multiple Access System (FDMA), a satellite communications system and a two-way radio communications system.

6. A mobile terminal for monitoring and controlling a vehicle, comprising:
- a plurality of sensors and at least one controller connected together in a network, wherein each of said plurality of sensors is operable to measure data relating to an operating characteristic of said vehicle to sense a predetermined condition on said vehicle; and
- a communications processor for enabling communications between said mobile terminal and a remotely located system controller, said communications processor being operable to:
  - transmit sensor signals to said remotely located system controller in connection with receiving an indication of said predetermined condition from one of said plurality of sensors;
  - receive at least one alert from said remotely located system controller,
  - receive an operation recommendation for said vehicle based on said condition, after receiving said alert for said condition;
  - receive one or more additional alerts for the same sensor signal after a time interval for said vehicle;

detect whether said condition remains, based on information from the same sensor, after said alert is sent a predetermined number of times; and initiate the operation recommendation for the vehicle when said condition is detected after said alert is sent a predetermined number of times.

7. The mobile terminal as recited in claim 6, wherein said network is a controller area network (CAN).

8. The mobile terminal as recited in claim 6, wherein said network comprises of an Ethernet or a local area network.

9. The mobile terminal as recited in claim 6, wherein said communications processor is operable to enable communications between said mobile terminal and said remotely located system controller using a wireless communications system.

10. The mobile terminal as recited in claim 9, wherein said wireless communications system is a mobile communications system selected from the group consisting of a Code Division Multiple Access (CDMA) communications system, a Time Division Multiple Access (TDMA) system, a Frequency Division Multiple Access System (FDMA), a satellite communications system and a two-way radio communications system.

11. The mobile terminal as recited in claim 7, wherein said CAN operates according to the SAE J1939 specification.

12. The mobile terminal as recited in claim 7, wherein said CAN operates according to the SAE J1708 specification.

13. A method of monitoring and controlling a vehicle from a remote location, comprising:

receiving information from a sensor in said vehicle regarding at least one of vehicle usage and operating characteristic of said vehicle;

detecting a condition associated with said vehicle based on said information;

generating an alert for said vehicle based on said condition;

generating an operation recommendation for said remote vehicle based on said condition, after the generation of an alert for said condition;

sending said alert to a remote site monitoring said vehicle;

detecting whether said condition remains, based on information from the same sensor, after said alert is sent a predetermined number of times; and initiating the operation recommendation when said condition is detected after said alert is sent a predetermined number of times.

14. The method of monitoring and controlling said vehicle as recited in claim 13, wherein said operation recommendation for said vehicle includes measures selected from shutting said vehicle off and placing said vehicle in a safe mode of operation.

15. The method of monitoring and controlling said vehicle as recited in claim 14, wherein said safe mode of operation defines vehicle operation which minimizes damage.

16. The method as recited in claim 13, wherein said alert is generated to said vehicle from said remote location using a wireless communications system.

17. The method as recited in claim 16, wherein said communications system is a mobile communications system selected from the group consisting of a Code Division Multiple Access (CDMA) communications system, a Time Division Multiple Access (TDMA) system, a Frequency Division Multiple Access System (FDMA), a satellite communications system and a two-way radio communications system.

18. An apparatus, comprising:

a processor module configured to:

receive information from a sensor in a remote vehicle regarding at least one of vehicle usage and operating characteristic of said remote vehicle;

detect a condition associated with said remote vehicle based on said information;

generate an alert for said condition for said remote vehicle based on said condition;

generate an operation recommendation for said remote vehicle based on said condition, after the generation of an alert for said condition;

send said alert to a monitor site remotely monitoring said remote vehicle;

receive instruction to initiate the operation recommendation from the monitor site based on a detection that said condition remains, based on information from the same sensor, after said alert is sent a predetermined number of times; and initiate the operation recommendation when said condition is detected after said alert is sent a predetermined number of times for said condition associated with said remote vehicle.

19. A system for monitoring and controlling a vehicle from a remote location, comprising:

means for receiving information from a sensor in said vehicle regarding at least one of vehicle usage and operating characteristic of said vehicle;

means for detecting a condition associated with said vehicle based on said information;

means for generating an alert for said condition;

means for generating an operation recommendation for said remote vehicle based on said condition, after the generation of an alert for said condition;

means for sending said alert to a site monitoring said vehicle;

means for detecting whether said condition remains, based on information from the same sensor, after said alert is sent a predetermined number of times; and means to initiate the operation recommendation when said condition is detected after said alert is sent a predetermined number of times.

20. The system for monitoring and controlling said vehicle as recited in claim 19, wherein said operation recommendation for said vehicle includes measures selected from shutting said vehicle off and placing said vehicle in a safe mode of operation.

21. The system for monitoring and controlling said vehicle as recited in claim 20, wherein said safe mode of operation defines vehicle operation which minimizes damage.

22. The system as recited in claim 19, wherein the means for generating an alert to said vehicle from the remote location includes means for generating an alert to said vehicle from the remote location using a wireless communication system.

23. The system as recited in claim 22, wherein said communications system is a mobile communications system selected from the group consisting of a Code Division Multiple Access (CDMA) communications system, a Time Division Multiple Access (TDMA) system, a Frequency Division Multiple Access System (FDMA), a satellite communications system and a two-way radio communications system.

24. A mobile terminal apparatus for monitoring and controlling a vehicle from a remote location, comprising:

means for measuring data relating to an operating characteristic of said vehicle to sense a predetermined condition on said vehicle;

means for enabling communications between said mobile terminal and a remotely located system controller, means for transmitting sensor signals to said remotely located system controller in connection with receiving an indication of said predetermined condition from one of said plurality of sensors;
means for receiving at least one alert from said remotely located system controller,
means for receiving an operation recommendation for said vehicle based on said condition, after receiving said alert for said condition;
means for receiving one or more additional alerts for the same sensor signal after a time interval for said vehicle;
means for detecting whether said condition remains, based on information from the same sensor, after said alert is sent a predetermined number of times; and
means for initiating the operation recommendation for the vehicle when said condition is detected after said alert is sent a predetermined number of times.

25. The apparatus as recited in claim 24, wherein said means for enabling communication communicates via a controller area network (CAN).

26. The apparatus as recited in claim 24, wherein said means for enabling communication communicates via an Ethernet or a local area network.

27. The apparatus as recited in claim 24, wherein said means for enabling communication enables communications between said mobile terminal and said remotely located system controller using a wireless communications system.

28. The apparatus as recited in claim 27, wherein said wireless communications system is a mobile communications system selected from the group consisting of a Code Division Multiple Access (CDMA) communications system, a Time Division Multiple Access (TDMA) system, a Frequency Division Multiple Access System (FDMA), a satellite communications system and a two-way radio communications system.

29. The apparatus as recited in claim 25, wherein said CAN operates according to the SAE J1939 specification.

30. The apparatus as recited in claim 25, wherein said CAN operates according to the SAE J1708 specification.

31. A method of monitoring and controlling a remotely located vehicle, comprising:
receiving at least one alert from a remotely located system controller, including an indication of a predetermined condition on said remotely located vehicle from one of a plurality of sensors,
receiving an operation recommendation for said vehicle based on said condition, after receiving said alert for said condition;
receiving one or more additional alerts for the same sensor signal after a time interval for said vehicle;
detecting whether said condition remains, based on information from the same sensor, after said alert is sent a predetermined number of times; and
initiating the operation recommendation for the vehicle when said condition is detected after said alert is sent a predetermined number of times.

32. The method as recited in claim 31, further comprising communicating via at least one of a controller area network (CAN), an Ethernet, or a local area network, or a wireless communications system.

* * * * *